United States Patent [19]

Kim et al.

[11] Patent Number: 5,548,270
[45] Date of Patent: Aug. 20, 1996

[54] BIT SEQUENTIAL TYPE PARALLEL COMPARATOR

[75] Inventors: Hyoung-Gon Kim; Young-Moo Kwon; Young Hoon Lee, all of Seoul, Rep. of Korea

[73] Assignee: Korea Institute of Science and Technology, Seoul, Rep. of Korea

[21] Appl. No.: 506,378

[22] Filed: Jul. 24, 1995

[30]    Foreign Application Priority Data

Jul. 26, 1994 [KR] Rep. of Korea .................. 18129/1994

[51] Int. Cl.$^6$ ........................................................ G06F 7/02
[52] U.S. Cl. .......................................................... 340/146.2
[58] Field of Search .......................................... 340/146.2

[56]                 References Cited

U.S. PATENT DOCUMENTS 5,262,969  11/1993  Ishihara ................................. 340/146.2
5,345,216   9/1994  Chopra et al. ......................... 340/146.2
5,425,131   6/1995  Basehore ............................... 340/146.2

*Primary Examiner*—Margaret Rose Wambach
*Attorney, Agent, or Firm*—Scully, Scott, Murphy & Presser

[57]                    ABSTRACT

An improved bit sequential type parallel comparator capable of locating a minimum value among values of 'm' bits stored in 'n' registers within 'm' clock cycles and the location thereof by bit-sequentially receiving those values, which includes a bit sequential type parallel comparator, which includes a minimum data detection circuit for detecting a minimum data by comparing a data of 'm' bits sequentially inputted from 'n' registers within 'm' clock cycles; a minimum data generation circuit for generating a 1's complementary value of a minimum data using the data of 'n' bits obtained by the minimum data detection circuit and an enable signal inputted from an eternally connected element; a minimum location information detection circuit for detecting a location of the minimum value among the 'n' register values using the data obtained by the minimum data generation circuit and the data obtained by the minimum data detection circuit and for resetting the minimum data detection circuit upon location of the minimum value using the detected minimum location information as a reset signal; and a minimum location generation circuit for locating a minimum value register location by logically operating upon information detected by the minimum location information detection circuit and for generating a minimum value register location using a 1's complement of the data generated by the minimum data generation circuit.

10 Claims, 5 Drawing Sheets

FIG. 7

| REGISTER'S 8-bit INPUT \ CYCLE | 0 | 1 | 2 | 3 | 4 | 5 |
|---|---|---|---|---|---|---|
| A  11001110 | 00 | 10 | 11 | 11 | 11 | 11 |
| B  00100001 | 00 | 00 | 00 | 10 | 11 | 11 |
| C  00110001 | 00 | 00 | 00 | 10 | 11 | 11 |
| D  01001100 | 00 | 00 | 10 | 11 | 11 | 11 |
| E  00001010 | 00 | 00 | 00 | 00 | 00 | 10 |
| F  00010001 | 00 | 00 | 00 | 00 | 10 | 11 |
| G  00000011 | 00 | 00 | 00 | 00 | 00 | 00 |
| H  00010000 | 00 | 00 | 00 | 00 | 10 | 11 |

| REGISTER'S 8-bit INPUT \ CYCLE | 6 | 7 | 8 | |
|---|---|---|---|---|
| A  11001110 | 11 | 11 | 11 | 11 |
| B  00100001 | 11 | 11 | 11 | 11 |
| C  00110001 | 11 | 11 | 11 | 11 |
| D  01001100 | 11 | 11 | 11 | 11 |
| E  00001010 | 11 | 11 | 11 | 11 |
| F  00010001 | 11 | 11 | 11 | 11 |
| G  00000011 | 00 | 10 | 00 | 10 |
| H  00010000 | 11 | 11 | 11 | 11 |

MINIMUM VALUE

BIT SEQUENTIAL TYPE PARALLEL COMPARATOR

BACKGROUND OF THE INVENTION

1. Field of the Invention

The present invention relates to a bit sequential type parallel comparator, and particularly to an improved bit sequential type parallel comparator capable of locating a minimum value among values of 'm' bits stored in 'n' registers within 'm' clock cycles and the location thereof by bit-sequentially receiving those values.

2. Description of the Conventional Art

Referring to FIG. 1, a conventional bit sequential type parallel comparator includes first through fourth comparators 100 through 103 provided for outputting a least value by comparing data pairs of 8-bit inputted in the form of four data of 8-bit from 8 registers(not shown) 'a' through 'h'; fifth and sixth comparators 104, 105 provided for each outputting a least value by comparing the 8-bit data outputted from each of the first through fourth comparators 100 through 103 in the form of two pairs of 8 bit data; and a seventh comparator 106 provided for computing a least value by comparing the 8-bit output data by the fifth and sixth comparators 104 and 105.

As described above, in the conventional 8-bit parallel comparator, when the 8-bit data from registers 'a' through 'h' is parallelly inputted into the first through fourth comparators 100 through 103 in the form of data pairs so as to locate a least value thereamong, the first through fourth comparators 100 through 103 compare the 8-bit data pairs outputted from each of the registers a,b and c,d and e,f and g,h and obtain the four least values thereamong which are in rum compared by the fifth and sixth comparators 10, 105 to obtain the two least values thereamong, which are then compared to obtain the least value therebetween by the seventh comparator 106.

The seventh comparator 106 compares the 8-bit data outputted from the fifth and sixth comparators 104, 105 and obtains a least value thereamong and locates the registers 'a' through 'h' having the least value.

In addition, referring to FIG. 2, there are provided first through fourth logic circuits 200 through 203 for logically operating upon respective data a3, b3 and a2, b2 and a1, b1 and a0, b0 outputted from two 4-bit registers A and B in the form of data pairs; a fifth logic circuit 204 provided for logically multiplying a result value logically operated by the first through fourth logic circuits 200 through 203 and a control signal outputted in accordance with the size of the two registers A and B; and a sixth logic circuit 205 provided for comparing output values logically operated by the fifth logic circuit 204 and for locating the one of the registers A and B having a least value.

The 4-bit comparator which is the object of a comparison of two registers A and B will now be explained.

To begin with, when the 4-bit data (a3, a2, a1, a0 =1, b3, b2, b1, b0 =1) from respective two registers A and B are inputted, a zero (0) is outputted from each of the first through fourth NOR gates NOR1 through NOR4 of the first through fourth logic circuits 200 through 203 and is inputted respectively into the first through eleventh AND gates AND 1 through AND 11 of the fifth logic circuit 204.

Accordingly, since a zero value is outputted from the first and the third through the eleventh AND gates AND1, AND3 through AND11 and is inputted respectively into a first and second OR gates OR1 and OR2 of a sixth logic circuit 205, the output value of the second AND gate becomes 1, and the output value is inputted into the first OR gate OR1, so that only the first OR gate OR1 outputs 1 irrespective of the input value of the other side, and the second OR gate OR2 outputs zero.

In addition, if the output value of the register B between two registers A and B is larger, only the second OR gate OR2 outputs 1, and the first OR gate OR1 and the eleventh AND gate AND11 output zero through the previously described same process.

In addition, if the value of two registers A and B is same, the output value of the first and second OR gates OR1 and OR2 is zero, and the output value of the eleventh AND gate AND 11 is 1, so that the compared value of 4-bit value of two registers can be obtained.

In addition, referring to FIG. 2, if the value of the register A is larger than that of the register B, a control signal CONT is inputted into a ninth AND gate AND9 as '1', if the value of the register B is larger than that of the register A, a control signal CONT is inputted into a tenth AND gate AND 10 as '1', and if the value of both the registers A and B are the same, the control signal CONT is inputted into the eleventh AND gate AND 11 as '1'.

However, since the conventional 4-bit or 8-bit parallel comparator uses a method of computing a least value by comparing the value of M-bit register with the value of the other register, the conventional comparator has disadvantages in that it needs much time so at to compare the output values when a plurality of registers are used. In addition, the conventional 4-bit or 8-bit parallel comparator must employ a plurality of comparators to compute the least values outputted from the many registers.

SUMMARY OF THE INVENTION

Accordingly, it is an object of the present invention to provide a bit sequential type parallel comparator, which overcomes the problems encountered in a conventional parallel comparator.

It is another object of the present invention to provide an improved bit sequential type parallel comparator capable of locating a minimum value among values of 'm' bit stored in 'n' register within 'm' clock cycle and the location thereof by bit-sequentially receiving those values.

To achieve the above objects, a bit sequential type parallel comparator is provided, which includes a minimum data detection circuit for detecting a minimum data by comparing a data of 'm' bit sequentially inputted from 'n' register within 'm' clock cycles; a minimum data generation circuit for generating a 1's complementary value of a minimum data using a data of 'n' bit obtained by the minimum data detection circuit and an enable signal inputted an externally connected element; a minimum location information detection circuit for detecting a location information having the minimum value among 'n' register values using a data obtained by the minimum data generation circuit and a data obtained by the minimum data detection circuit and for resetting the minimum data detection circuit corresponding to the minimum value using the detected minimum location information as a reset signal; and a minimum location indication generation circuit for locating a minimum value location by logically operating an information detected by the minimum location information detection circuit and for computing a minimum value using a 1's complement for a data generated by the minimum data generation circuit.

3

BRIEF DESCRIPTION OF THE DRAWINGS

FIG. 7 is a table showing the result of an operation of a minimum data detection circuit so as to compute a minimum value and the location thereof of Fig. 3 according to the present invention.

DETAILED DESCRIPTION OF THE INVENTION

Figure 1:
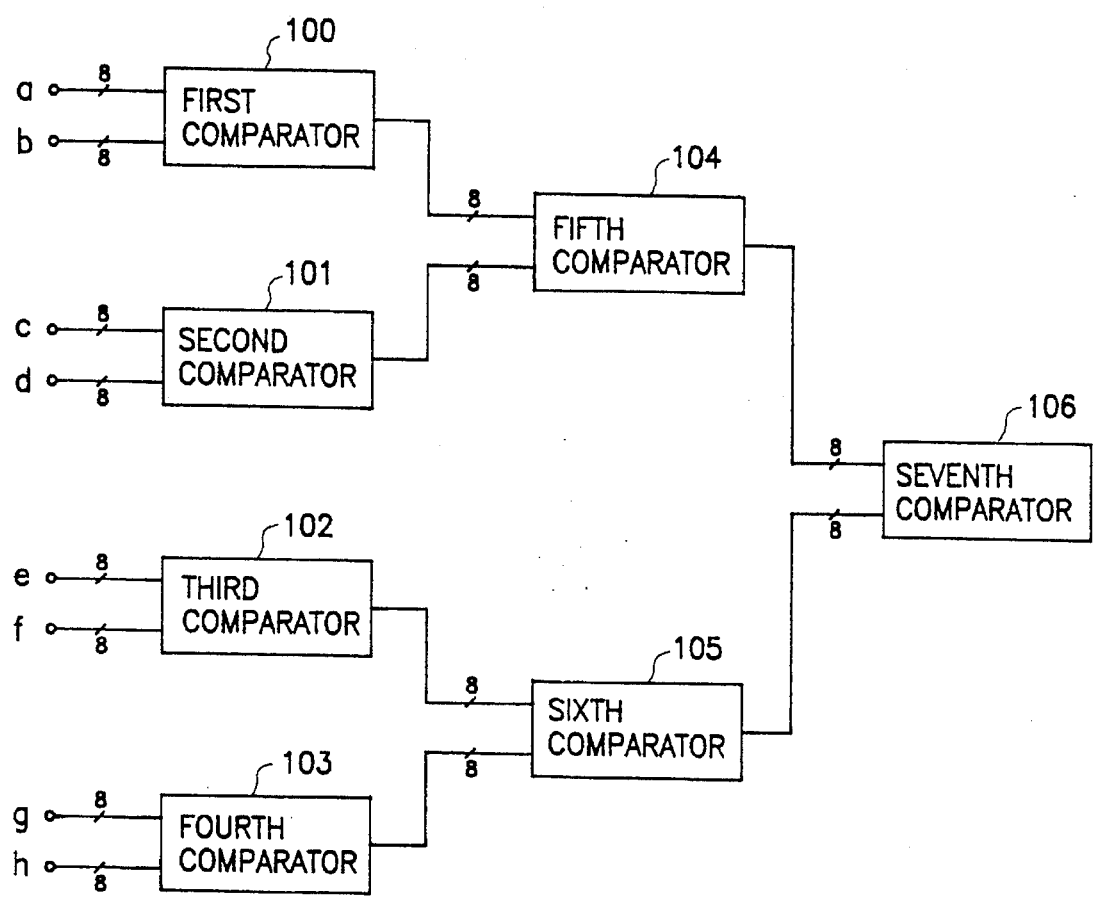
FIG. 1 is a schematic circuit diagram of a conventional 8-bit comparator.
Figure 2:
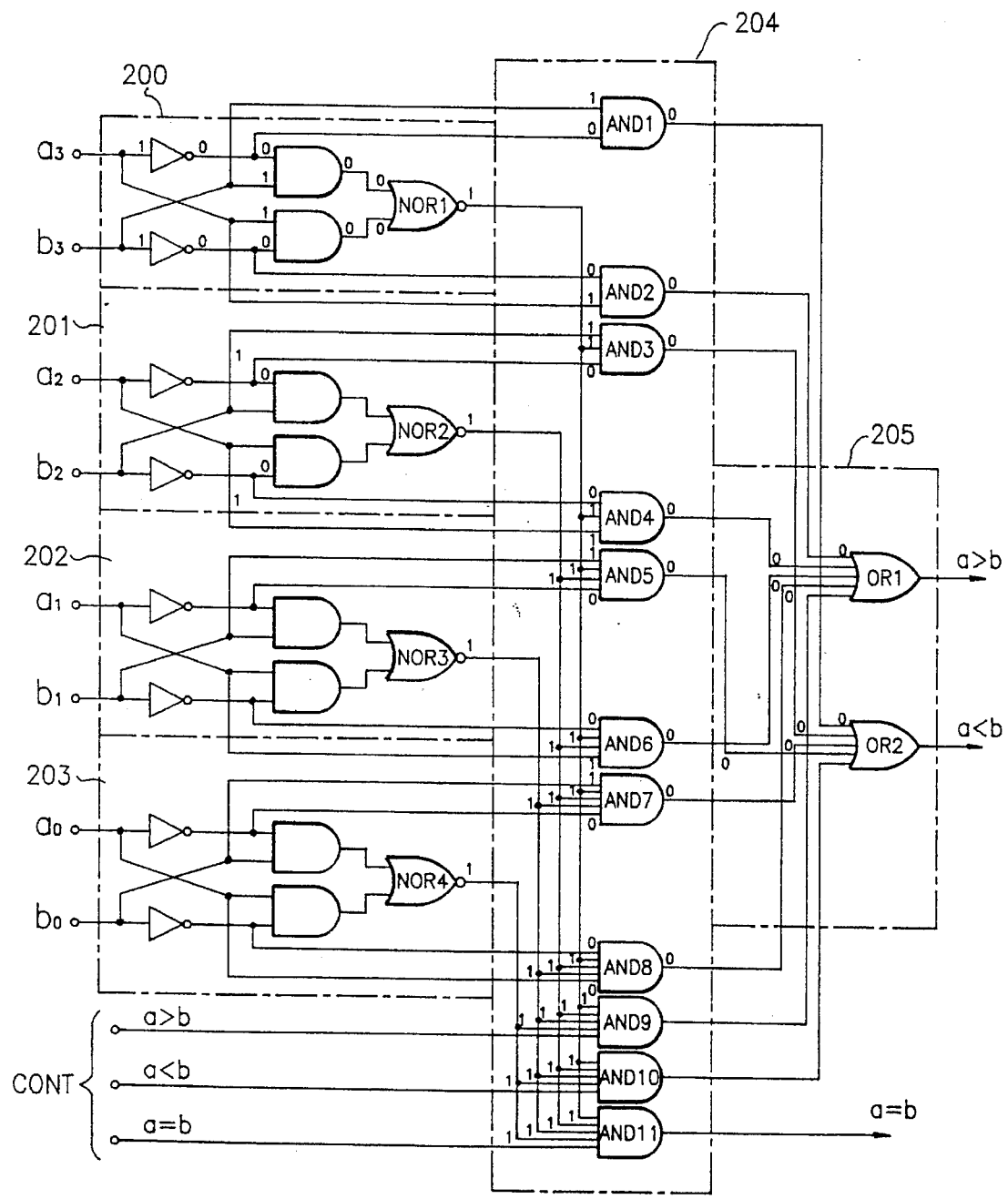
FIG. 2 is a logic circuit diagram of a conventional comparator of FIG. 1.
Figure 3:
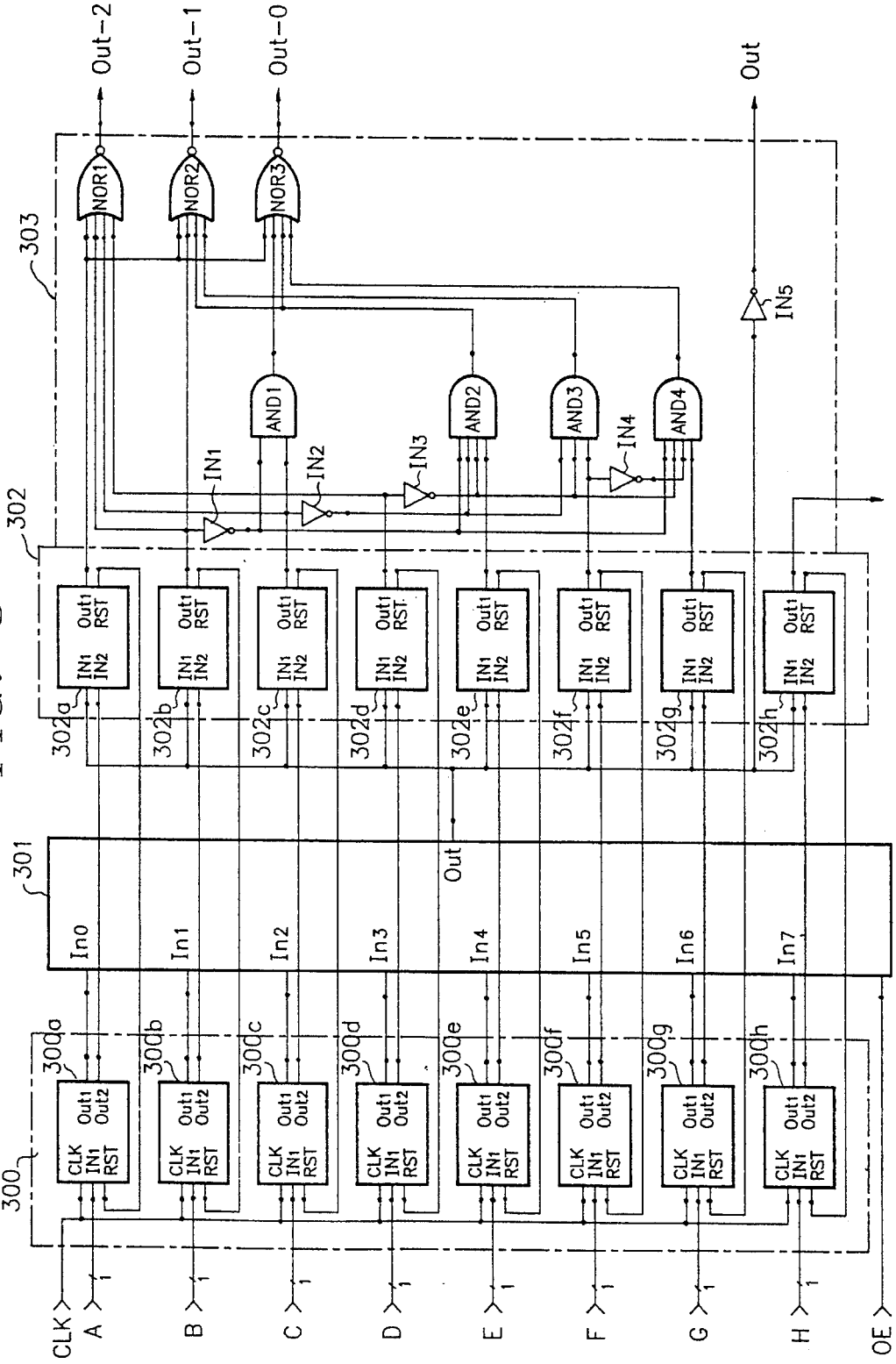
FIG. 3 is a circuit diagram of a bit sequential type parallel comparator according to the present invention.

Referring to FIG. 3, a bit sequential type parallel comparator according to the present invention includes a minimum data detection circuit 300 provided for detecting data having a minimum value by comparing a m-bit data sequentially inputted in most significant bit first order from 'n' registers A through H under timing of an input clock and for outputting a 16-bit information; a minimum data generation circuit 301 provided for generating a minimum data in accordance with an output enable signal OE applied from an externally connected element (not shown) as a bit sequential input of an 8-bit data outputted from the minimum data detection circuit 300 and the data outputted from the 'n' registers A through H is completed; a minimum location information detection circuit 302 provided for detecting the location information of the register having a least value among the 'n' registers A through H using the data outputted from the minimum data generation circuit 301 and the 8-bit data detected by the minimum data detection circuit 300 and for resetting the minimum data detection circuit 300 corresponding to a least value using a detected minimum location information as a reset signal RST; and a minimum location indication generation circuit 303 provided for locating a minimum value by logically operating upon the 8-bit information detected by the minimum location information detection circuit 302 and for locating a minimum value using a 1's complement technique with respect to the minimum data sequentially outputted from the minimum data generation circuit 301.

The minimum data detection circuit 300, which is configured to correspond with the 'n' registers A through H, includes the first through eight bit comparators 300a through 300h provided from detecting a data having a least value among the m-bit data which is sequentially inputted from the register in a most significant bit first order in accordance with an input clock CLK.

In addition, the minimum location detection circuit 302, which is configured to correspond with the 'n' registers A through H, includes a first through eight location information comparators 302a through 302h provided for detecting the location information of the register having the least value by comparing the m-bit data sequentially outputted from the first through eighth bit comparators 300a through 300h of

4 the minimum data detection circuit 300 and the data generation circuit 301.

Figure 4:
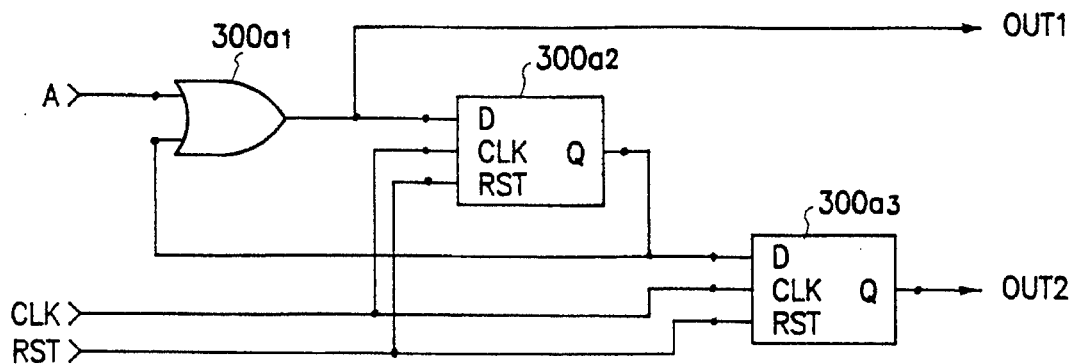
FIG. 4 is a circuit diagram of a bit comparator of a minimum data detection circuit of FIG. 3 according to the present invention.

As shown in FIG. 4, each of the first through eighth minimum bit comparators 300a through 300h of the minimum data detection circuit 300 each includes an OR gate 300-1 for ORing a current 1-bit data sequentially inputted from external registers A through H and a previously ORed data and for outputting the currently ORed data bit to the minimum data generation circuit 301 (OUT 1); a first flip-flop 300a2 provided for synchronizing the output value of the OR-gate 300a1 and for outputting the synchronized output value into the OR gate 300a1 by holding the synchronized output value until a reset signal RST is outputted from the minimum location information detection circuit 302; and a second flip-flop 300a3 provided for synchronizing the output value of the first flip-flop 300a2 and for outputting the output value thereof into the minimum location information detection circuit 302 (OUT 2) by holding the output value until the reset signal RST is outputted from the minimum location information detection circuit 302.

Figure 5:
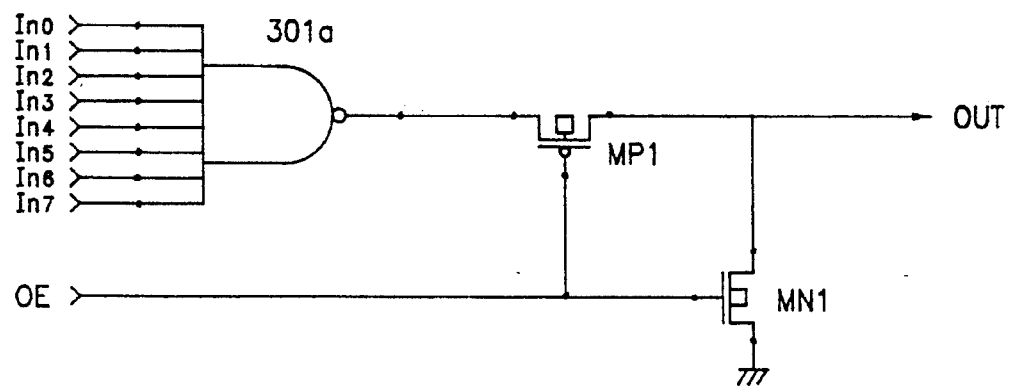
FIG. 5 is a circuit diagram of a minimum data generation circuit of FIG. 3 according to the present invention.

In addition, the minimum data generation circuit 301, as shown in FIG. 5, includes a NAND gate 301a provided for NANDing the 8-bit data (In0 through In 7) outputted from the first through eighth bit comparators 300a through 300h; a PMOS switching device MP1—which is conducted or cut off by an output enable signal OE outputted from an externally connected element as the sequential input of data outputted from the 'n' registers A through H is completed—provided for sequentially inputting the output value of the NAND gate 301a into the first through eighth bit location information comparators 302a through 302h; and a NMOS switching device MN1—which is conducted or cut off by the external output enable signal OE—provided for cutting off (shunting to ground) or inputting the data sequentially outputted from the PMOS switching device MP1 into the first through eighth location information comparators 302a through 302h.

Figure 6:
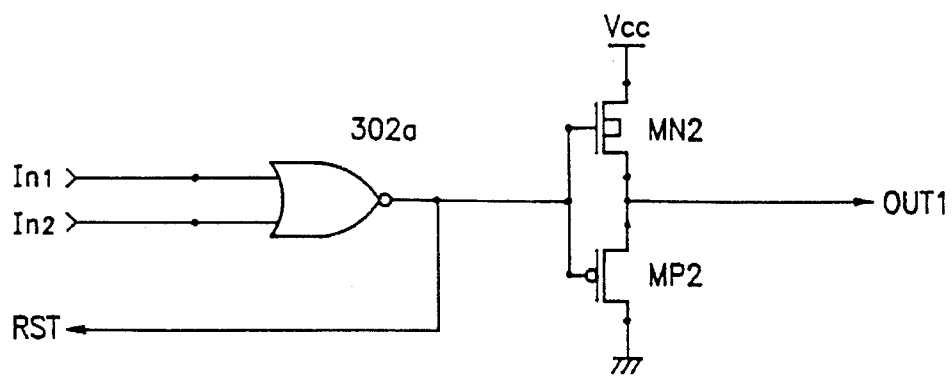
FIG. 6 is a circuit diagram of a minimum location information judgement circuit of FIG. 3 according to the present invention.

In addition, the first through eighth location information comparators 302a through 302h of the minimum location information detection circuit 302, as shown in FIG. 6, each includes a NOR gate provided for resetting a comparator among the first through eighth bit comparators 300a through 300h of the minimum data detection circuit 300 corresponding to a least bit by NANDing the 1-bit data sequentially outputted from the first through eighth bit comparators 300a through 300h of the minimum data detection circuit 300 and 1-bit data sequentially outputted from the minimum data generation circuit 301; and a serially connected NMOS switching device MN2 and PMOS switching device MP2, which are conducted or cut off in accordance with the output value of the NOR gate, provided for outputting the location information of a register having a least values into the location indication generation circuit 303.

In addition, the minimum location generation circuit 303 includes a first through fourth inverters IN1 through IN4 provided for inverting the data sequentially outputted from the second through fourth location information comparators 302b through 302d of the minimum location information detection circuit 302 and the sixth location information comparator 302f; a first AND gate AND1 provided for ANDing the output values of the first inverter IN1 and the output values of the third location information comparator 302c; a second AND gate AND2 provided for ANDing the output value of the first through third inverters IN1 through IN3 and the output value of the fifth location information comparator 302e; a third AND gate AND3 provided for ANDing the output value of the second and third inverters IN2 and IN3 and the output value of the sixth location information comparator 302f; a fourth AND gate AND4 provided for ANDing the output value of the first, third, and fourth inverters IN1, IN3, and IN4 and the output value of the seventh location information comparator 302g; a first NOR gate NOR1 provided for NORing the data sequentially outputted from the first through fourth location information comparators 302a through 302d; a second NOR gate NOR2 provided for NORing the output values of the first and second location information comparators 302a and 302b and the output values of the second and third AND gates AND2 and AND3; a third NOR gate NOR3 provided for NORing the output value of the first location information comparator 302a and the output values of the first, second, and fourth AND gates AND1, AND2, and AND4; and a fifth inverter IN5 provided for inverting the data sequentially outputted from the minimum data generation circuit 301.

Here, when the 3-bit output value of the first through third NOR gates NOR1 through NOR3 is converted into a binary coded decimal number, the register having the least value among the eight registers A thorough H can be located thereby.

The operation of the bit sequential type parallel comparator according to the present invention will now be explained with reference to FIGS. 3 through 7.

To begin with, when 8-bit data stored in the eight registers A through H are sequentially inputted into the minimum data detection circuit 300, the first through eighth bit comparators 300a through 300h of the minimum data detection circuit 300 synchronize the data inputted thereto to the input clock CLK and detect the data having a least value.

That is, the first through eighth bit comparators 300a through 300h of the minimum data detection circuit 300 are shown in FIG. 4.

Since FIG. 4 shows the first bit comparator 300a among the first through eighth bit comparators 300a through 300h, and since the remaining second through eighth bit comparators 300b through 300h have the same construction as the first bit comparator 300a, the operations of each of the second through eighth bit comparators 300b through 300h are explained along with the first bit comparator 300a.

To begin with, when the 8-bit data is sequentially outputted from the eight registers A through H corresponding to the first through eighth bit comparators 300a through 300h, each OR gate 300a1 of the first through eighth bit comparators 300a through 300h ORs the 1-bit data outputted from each of the registers A through H with a low signal state of "0" which is fed back from the first flip-flop by the reset signal RST and outputs the ORed data to the input terminal of the first flip-flop 300a2.

At this time, as the 8-bit data is sequentially outputted from the registers A through H, when 1 (one) is inputted, the OR-gate 300a1 ORs 0 (zero) outputted from the output terminal Q of the first flip-flop 300a2 with the input 1 (one) and outputs a high level signal (1) to the input terminal of the first flip-flop 300a2 and also to a NAND-gate 301a of the minimum data generation circuit 301 as shown in FIG. 5.

Therefore, when the first flip-flop 300a2 outputs a high level signal until the reset signal RST is applied from the external element irrespective of the next input bit and outputs the high level signal to the OR-gate 300a1 and the second flip-flop 300a3.

That is, the output value of the OR-gate 300a1 remains 1 (one) until the reset signal RST becomes 1 (one) irrespective of the next input bit. The high level signal is outputted from the output terminal Q of the first flip-flop 300a2 since the output of the OR-gate 300a1 is always 1 (one) until the reset signal RST becomes 1 (one) irrespective of the next input bit and is inputted into the NOR-gate 300a1 of the minimum location information detection circuit 302 as shown in FIG. 6. In addition, a level signal is outputted from the output terminal Q of the second flip-flop 300a3 at the next clock CLK and then inputted into the NOR-gate 300a1 of the minimum location information detection circuit 302 as shown in FIG. 6.

The operation cycle of the bit sequential type parallel comparator will now be explained with reference to FIG. 7.

The 2-bit values shown in FIG. 7 represents a state value of the first, and second flip-flops 300a2, 300a3 of the first through eighth bit comparators 300a through 300h.

To begin with, as shown in FIG. 7, at an initial stage, the first and second flip-flops 300a2 and 300a3 of the first through eighth bit comparators 300a through 300h are reset to have a state value of 0 (zero).

Thereafter, when the reset signal is released, the most significant bit of the eight data is outputted from each of the eight registers A through H for comparing in a first clock CLK cycle. At this time, among the eight data, since the data of the most significant bit of the first register A is 1 (one) and since the data of the most significant data of the remaining registers B through H are 0 (zero), a high level signal, that is, 1 (one), is outputted from the output terminal Q of the first flip-flop 300a2 of the first bit comparator 300a. In addition, a low level signal, that is, 0 (zero), is outputted from the second flip-flop 300a3 and the first and second flip-flops of the second through eighth bit comparators 300b through 300h as shown in FIG. 7, and inputted into the minimum location information detection circuit 302.

Thereafter, in the second clock (CLK) cycle, the next bit of the most significant bit is processed of the eight input data and, at this time, as shown in FIG. 7, since there exists a value of 1 (one) of a data between the first register A and fourth register D, the first flip-flop 300a2 of each of the first and fourth bit comparators 300a and 300d outputs 1 (one) of a low level signal.

Meanwhile, the second flip-flop 300a3 of the first bit comparator 300a outputs a high level signal because the output of the first flip-flop 300a2 in the first clock CLK cycle is a high level signal.

The data outputted from the registers A through H are bit-sequentially processed. In the seventh clock (CLK) cycle, as shown in FIG. 7, since there exists a 1 (one) in the seventh register G having a minimum data value 00000011, the first and second flip-flops 300a2 and 300a3 of the first through sixth and eighth bit comparators 300a through 300f and 300h output a high level signal. In addition, the first flip-flop of the seventh bit comparator 300g outputs a high level signal, and the second flip-flop thereof outputs a low level signal.

The minimum 8-bit data detected by the OR-gates 300a1 of the first through eighth comparators 300a through 300h of the minimum data detection circuit 300, as shown in FIG. 5, are inputted into the NAND-gate 301a of the minimum data generation circuit 301.

The NAND-gate 301a of the minimum data generation circuit 301 NANDs the 8-bit data obtained by the OR-gates 300a1 of the first through eighth bit comparators 300a through 300h. At this time, if the 8-bit data outputted from the OR-gates 300a1 of the first through eighth bit comparators 300a through 300h is a high level signal, the NAND-gate outputs a low level signal. If at least one output from the first through eighth bit comparators 300a through 300h is a low level signal, the NAND-gate 301a outputs a high level signal.

When the output of the OR-gates 300*al* of the first through eighth bit comparators 300*a* through 300*h* are a low level signal, it means that only low level signal data values are inputted into the first through eighth bit comparators 300*a* through 300*h* of the minimum data detection circuit 300.

Meanwhile, when the outputs of the OR-gate 300*a* 1 of the first through eighth bit comparators 300*a* through 300 *h* are a high level signal, it means that at least one high level signal is outputted from the eight registers A through H. In addition, it means the register from which the last high level signal was outputted has a minimum data value. That is, for the information of the register having a minimum value, the minimum data generation circuit 301 and the minimum location information detection circuit 302 are used.

As previously described, if a low level signal is outputted from at least one OR-gate 300*a* among the first through eighth bit comparators 300*a* through 300*h*, the NAND-gate 301*a* of the minimum data generation circuit 301 outputs a high level signal. If a high level signal is outputted from the OR-gate 300*a*1, the NAND-gate outputs a low level signal.

That is, a 1's complementary value of a minimum data is outputted.

The complementary value outputted from the NAND-gate 301*a* is inputted into the minimum location information detection circuit 302 and the minimum location indication generation circuit 303 through the P-MOS switching device MP1 enabled by the output enable signal OE. At this time, the output enable signal OE is a low level signal when data are bit-sequentially inputted from the registers A through H. When the bit sequential input is finished, that is, once the 8-bit data has been compared in a cycle, the output enable signal OE becomes a high level signal.

Therefore, when a high level signal is outputted from an OR-gate of the first through eighth bit comparators 300*a* through 300*h*, and when the output enable signal OE is a low level signal, the P-MOS switching device MP1 of the minimum data generation circuit 301 becomes conductive. A low level signal NANDed by the NAND-gate 301a is inputted into the NOR-gate of the minimum location information detection circuit 302 and the fifth inverter IN5 of the minimum location indication generation circuit 303 through the P-MOS switching device MP1.

In addition, when a low level signal is outputted from an OR-gate 300*a*1 among the first through eighth bit comparators 300*a* through 300*h*, and when the output enable signal OE is a low level signal, a high level signal NANDed by the NAND-gate 301*a* is inputted into the NOR-gate of the minimum location information detection circuit 302 and the fifth inverter IN5 of the minimum location indication generation circuit 303 through the PMOS switching device MP1 as shown in FIG. 6.

On the contrary, when the bit sequential input is finished, and when the output enable signal OE becomes a high level signal, a low level signal is inputted into the NOR-gate of the minimum location information detection circuit 302 and the fifth inverter IN5 of the minimum location indication generation circuit 303 irrespective of the output of the NAND gate 301*a*.

That is, the condition that 0 (zero) is outputted from the output terminal (OUT) of the minimum data generation circuit 301 occurs when the output of an OR gate 300*a*1 of the first through eighth bit comparators 300*a* through 300*h* is a high level signal or when an outside output enable signal OE is a high level signal. Besides, the output terminal (OUT) of the minimum data generation circuit 301 always outputs a high level signal and has a 1's complementary value of the minimum input data.

Meanwhile, the NOR-gates of the first through eighth location information comparators 302*a* through 302*h* in the minimum location information detection circuit 302, as shown in FIG. 6, NOR the data bit values outputted from the output terminal "OUT" of the minimum data generation circuit 301 and the data bit values outputted from the second flip-flops 303*a*3 of the first through eighth bit comparators 300*a* through 300*h* of the minimum data detection circuit 300. At this time, as shown in FIG. 7, the second flip-flop of the seventh bit comparator 300*g* of the minimum data detection circuit 300 connected to the seventh register G having a minimum value 0000011 among the eight registers A through H outputs a low level signal to one input terminal of the NOR-gate in the seventh location information comparator 302*g*.

In addition, since a high level signal outputted from the OR-gates 300*a*1 of the first through eighth bit comparators 300*a* through 300*h* is inputted into the NAND-gate 301*a* of the minimum data generation circuit 301, a low level signal is inputted into the NOR-gate of the seventh location information comparator 302*g*. The NOR-gate therefore outputs a high level signal.

The high level signal outputted from the NOR-gate enables the NMOS switching device MN2 to be conductive and resets the first and second flip-flops of the seventh bit comparator 300*g* corresponding to the minimum input value. As shown in FIG. 7, the output value of the first and second flip-flops of the seventh bit comparator 300*g* in the seventh clock CLK cycle becomes a low level signal.

Meanwhile, if the first through eighth location information bit circuits 302*a* through 302*h* output at least one high level signal, the first and second flip-flops of the first through eighth bit comparators 300*a* through 300*h* corresponding thereto are reset to 0 (zero).

In addition, after the eight clock CLK cycles, in case that an output enable signal OE outputted from the externally connected element is a high level signal, since the NMOS switching device MN1 of the minimum data generation circuit 301 becomes conductive, a low level signal is inputted to the NOR-gates of the first through eighth location information comparators 302*a* through 302*h*.

Therefore, as described above, since the NOR-gate of the first through sixth and eighth location information comparators 302*a* through 302*f* and 302*h* logically NOR the high level signal outputted from the first through sixth and eighth bit comparators 300*a* through 300*f* and 300*h* and the low level signal outputted from the minimum data generation circuit 301 and outputs a low level signal, the PMOS-switching devices MP2 of the first through sixth and eighth location information comparators 302*a* through 302*f* and 302*h* become conductive and output a low level signal. The NMOS-switching device MN2 is off.

In addition, the NOR-gate of the seventh location information comparator 302*g* NORs the low level signal outputted from the seventh bit comparator 300*g* and the low level signal outputted from the second flip-flop of the minimum data generation circuit 301 and outputs a high level signal. Thereafter, the NMOS-switching device MN2 become conductive and the outputs a high level signal, and the PMOS switching device MP2 is off.

The low level signal outputted from the first through sixth and eighth location information comparators 302*a* through 302*f* and 302*h* of the minimum location information detection circuit 302 is inputted into the first through third NOR gates NOR1 through NOR3 of the minimum location indication generation circuit 303, the first through fourth inverters IN1 through IN4, and the first through fourth AND-gates AND1 through AND4.

In addition, the high level signal outputted from the seventh location information comparator 302g of the minimum location information detection circuit 302 is inputted into the fourth AND-gate of the minimum location indication generation circuit 303.

The minimum location indication generation circuit 303 has a most minimum value among the values of the eight registers A through H. In case that there are registers having more than one most minimum value, the most minimum address is outputted. That is, since there are eight registers A through H, three address bits are required. For that reason, the first through third NOR gates NOR1 through NOR3 are provided.

A value of 1 (one) is outputted from that comparator, corresponding to a most minimum value data register, among the first through eighth location information comparators 302a through 302h. Using the value of 1 (one), the corresponding address bit value is obtained.

For example, in case that the most minimum register address is 2 (two), the output bit value should be "010," the output value of the first through eighth location information comparators 303 corresponding thereto is inputted into the first through third NOR gates NOR1 through NOR3.

The reason is that if there is at least a single value of 1 (one) in the input values of the first through third NORing devices NOR1 through NOR3, the output value becomes 0 (zero).

In addition, if a value of 0 (zero) exists among the address bit values corresponding to the registers A through H, the output value the corresponding comparators among the first through eighth location information comparators 302a through 302h is inputted into the corresponding NOR gates among the first through third NOR gates NOR1 through NOR3.

Meanwhile, in case that more than one most minimum value exists among the input values, that is, for example, if the output values outputted from the second and third registers B and C are the same as the most minimum value as well, the address output by the first through third NOR gates NOR1 through NOR3 should be "001" or "010," however, in case of constructing the above described comparator, the output value is "000."

In the present invention, to generate an address of a register having a most minimum value without generating the above mentioned value of "000," the first through fourth inverters IN1 through IN4 and the first through fourth AND gates AND1 through AND4 plus the first through third NOR gates NOR1 through NOR3 are provided.

Describing the above mentioned construction in detail, as shown in FIG. 7, after the sixth clock CLK cycle, the first through third inverters IN1 through IN3 of the minimum location indication generation circuit 303 invert the low level signals outputted from the second through fourth location information comparators 302b through 302d of the minimum location information generation circuit 302 into high level signals and input the inverted values into the first through fourth AND-gates AND1 through AND4, respectively. In addition, the fourth inverter IN4 inverts the low level signal outputted from the sixth location information comparator 302f into a high level signal and inputs the inverted value into the fourth AND-gate AND4.

Therefore, the first AND-gate AND1 ANDs the high level signal from the first inverter IN1 and the low level signal from the third location information comparator 302c, and output the low level signal to the third NOR gate NOR3. The second AND-gate AND2 ANDs the high level signal output from the first through third inverters IN1 through IN3 and the low level signal outputted from the fifth location information comparator 302a and outputs the ANDed value to the second NOR gate NOR2. The third AND-gate AND3 ANDs the high level signal outputted from the second and third inverters IN2 and IN3 and the low level signal output from the sixth location information comparator 302f and applies the ANDed value to the second NOR gate NOR2.

In addition, the fourth AND-gate AND4 ANDs the high level signal outputted from the first, third, and fourth inverters IN1, IN3, IN4 and the high level signal outputted from the seventh location information comparator 302g and applies the ANDed value into the third NOR gate NOR3.

Therefore, the first NOR gate NOR1 output a high level signal of 1 (one) to the output terminal out-2 upon NORing the low level signals outputted from the first through fourth location indication comparators 302a through 302d. The second NOR gate NOR2 outputs a high level signal of 1 (one) to the output terminal out-1 by NORing the low level signals outputted from the first and second location information comparators 302a and 302b and the low level signals outputted from the second and third AND-gates AND2 and AND3. The third NOR gate NOR3 outputs a low level signal of 0 (zero) to the output terminal out-0 by NORing the low level signal outputted from the first location information comparator 302a and the first and second AND-gates AND1 and AND2 and the high level signal outputted from the fourth AND-gate AND4.

The output terminals out-2, out-1, out-0 output an upper bit, middle bit, and lower bit, respectively, in order.

Converting the bit values of "1, 1, 0" outputted from the output terminals out-2, out-1, out-0 into a decimal code, as shown in FIG. 7, it can be found that the seventh register G has the most minimum value.

In addition, since the output value from the NAND-gate 301a and the PMOS switching device MP1 of the minimum data generation circuit 301 is the 1's complementary value of the most minimum register G among the eight registers A through H, the value of the seventh register G having the most minimum value can be obtained by inverting the 1's complementary value using the fifth inverter IN5 of the minimum location indication generation circuit 303.

That is, the output value of the minimum data generation circuit 301 is 0 (zero) when the output value of the OR-gates 300a 1 in the first through eighth bit comparators 300a through 300h is 1 (one) or when the output enable signal OE is 1 (one). Besides, the output value of the minimum data generation circuit 301 is always 1 (one). That is, it has a 1's complementary value of the most minimum data bit. Since the output value of the first flip-flop 300a2 during the first clock CLK cycle through the sixth clock cycle and the first through eighth bit comparators 300a through 300h—the output value of the OR-gates 300al —is not 1 (one), the output value of "111111" is outputted at the sixth cycles of the NAND-gates 301a generation circuit 301. The NAND-gate 301a outputs "0, 0" at the seventh and eighth clock cycle since the output value of the OR-gate 300a1 of the first through eighth bit comparators 300a through 300h is "1 (one)."

Therefore, if the output value of "11111100" of 8-bit outputted at the eighth clock cycle from the minimum data generation circuit 301 is inverted bit by bit by the fifth inverter IN5, the output value of "11000000" of the seventh register G which is the most minimum value can be obtained.

As described above, the present invention is directed to provide an improved bit sequential type parallel comparator capable of easily locating the most minimum value at a predetermined cycle as much as the number of bits of the input registers and the register related thereto without limitation to the number of registers which are the object of a comparison. In addition, the present invention can more quickly obtain the desired output value by processing a comparison operation within a desired time irrespective of the number of the data inputs. Moreover, since the construction thereof is simple, it is easy to manufacture, reducing the manufacturing cost.

What is claimed is:

1. A bit sequential type parallel comparator, comprising:
   minimum data detection means for detecting a minimum data by comparing a data of 'm' bits sequentially inputted from 'n' registers within 'm' clock cycles;
   minimum data generation means for generating a 1's complementary value of the minimum data of 'n' bits detected by said minimum data detection means in response to an externally applied enable signal;
   minimum location information detection means for detecting a location of a register having the minimum data value among said 'n' registers in accordance with the data generated by said minimum data generation means and the data detected by the minimum data detection means and for resetting the minimum data detection means upon location of the register having the minimum value using the detected minimum location information as a reset signal; and
   minimum location generation means for locating a minimum value register's location by logically operating the data detected by said minimum location information detection means and for generating a minimum value location in accordance with a 1's complement of the data generated by the minimum data generation means.

2. The comparator of claim 1, wherein said minimum data detection means includes 'n' bit comparators provided for detecting data having a minimum value among the data of 'm' bits sequentially inputted in a most significant bit—first order thereto.

3. The comparator of claim 1, wherein said minimum location information detection means includes first through nth location information comparators for obtaining a location information of the register having the minimum value by comparing the data of 'm' bits sequentially outputted from a bit comparator of the minimum data generation means.

4. The comparator of claim 2, wherein said 'n' bit comparators each include a logic device for logically operating a current data bit sequentially inputted from a corresponding one of said 'n' registers and a previously outputted data bit and for outputting the logically operated data to the minimum data generation means; a first flip-flop for synchronizing an output value of said logic device to an input clock cycle and for feeding back the output value to said logic device by holding the output value until a reset signal is received from the minimum location information judgement means; and a second flip-flop for synchronizing the output value of the first flip-flop to an input clock cycle and for outputting the output value of said first flip-flop to the minimum location information detection means by holding the output value until said reset signal is received from the minimum location information detection means.

5. The comparator of claim 4, wherein said logic device is an OR-gate.

6. The comparator of claim 1, wherein said minimum data generation means includes a logic device for logically operating upon 'n' bit data inputted from 'n' comparators; a PMOS switching device, which is caused to conduct or to be cut off by an externally applied enable signal, for sequentially inputting the output value of the logic device into 'n' location information comparators; and an NMOS switching device, which is caused to conduct or to be cut off by said externally applied enable signal, for cutting off or transferring the data inputted into the 'n' location information comparators sequentially outputted from the PMOS switching device.

7. The comparator of claim 6, wherein logic device is a NAND gate having 'n' inputs.

8. The comparator of claim 1, wherein said minimum location generation means includes first through fourth inverters for invertingly outputting the data sequentially outputted from a second through fourth location information comparators and a sixth location information comparator of the minimum location information detection means; a first logic multiplication device for logically multiplying the output value of the first inverter and the output value of a third location information comparator; a second logic multiplication device for logically multiplying the output value of the first through third inverters and the output value of the fifth location information comparator; a third logic multiplication device for logically multiplying the output values of the second and third inverters and the output value of the sixth location information comparator; a fourth logic multiplication device for logically multiplying the output values of the first, third, and fourth inverters and the output value of a seventh location information comparator; a first logic device for logically operating upon the values sequentially outputted from the first through fourth location information comparators; a second logic device for logically operating upon the output values of the first and second location information comparators and the output values of the second and third logic multiplication devices; a third logic device for logically operating upon the output value of the first location information comparator and the output values of the first, second, and fourth logic multiplication devices; and a fifth inverter provided for outputting a minimum data value by inverting the data sequentially outputted from the minimum data generation means.

9. The comparator of claim 8, wherein said first through third logic devices are NOR gates.

10. The comparator of claim 6, wherein the output value of said minimum data generation is a 1's complementary value representing the location of the value having the minimum data value.

\* \* \* \* \*

UNITED STATES PATENT AND TRADEMARK OFFICE
CERTIFICATE OF CORRECTION

PATENT NO. : 5,548,270
DATED : August 20, 1996
INVENTOR(S) : Hyoung-Gon Kim, et al.

It is certified that error appears in the above-indentified patent and that said Letters Patent is hereby corrected as shown below:

On the Title Page, Section [75]: "Young-Moo Kwon" should read --Yong-Moo Kwon--

Signed and Sealed this

Fifteenth Day of July, 1997

Attest:

BRUCE LEHMAN

Attesting Officer

Commissioner of Patents and Trademarks